United States Patent

[11] 3,633,791

[72] Inventor Earl K. Kelly
 Lynwood, Calif.
[21] Appl. No. 42,265
[22] Filed June 1, 1970
[45] Patented Jan. 11, 1972
[73] Assignee McDonnell Douglas Corporation

[54] ROTARY RIVET DISPENSER
 3 Claims, 2 Drawing Figs.
[52] U.S. Cl.......................................................... 221/167,
 221/182
[51] Int. Cl......................................................... B65g 47/14
[50] Field of Search............................................ 221/173,
 175, 177, 182, 167, 168, 203, 183; 222/167

[56] References Cited
 UNITED STATES PATENTS

| | | | |
|---|---|---|---|
| 2,678,238 | 5/1954 | Schutz.............................. | 222/167 X |
| 1,221,136 | 4/1917 | Boudwin........................... | 222/167 |
| 1,146,024 | 7/1915 | Rumney............................ | 221/182 X |
| 1,741,033 | 12/1929 | Neidlinger........................ | 221/182 |
| 3,101,832 | 8/1963 | Wyle................................. | 221/173 X |
| 1,481,064 | 1/1924 | Ochs................................. | 221/177 X |

*Primary Examiner*—Robert B. Reeves
*Assistant Examiner*—Thomas E. Kocovsky
*Attorneys*—Walter J. Jason, Donald L. Royer and Robert O. Richardson ABSTRACT: A rotary rivet dispenser for feeding slug rivets to an injector mechanism on the head of an automatic riveting machine. A rotary rivet slug container with an inner scoop aligns rivet slugs in the container for movement into a delivery tube by gravity feed assisted by intermittent air pressure.

PATENTED JAN 11 1972
3,633,791
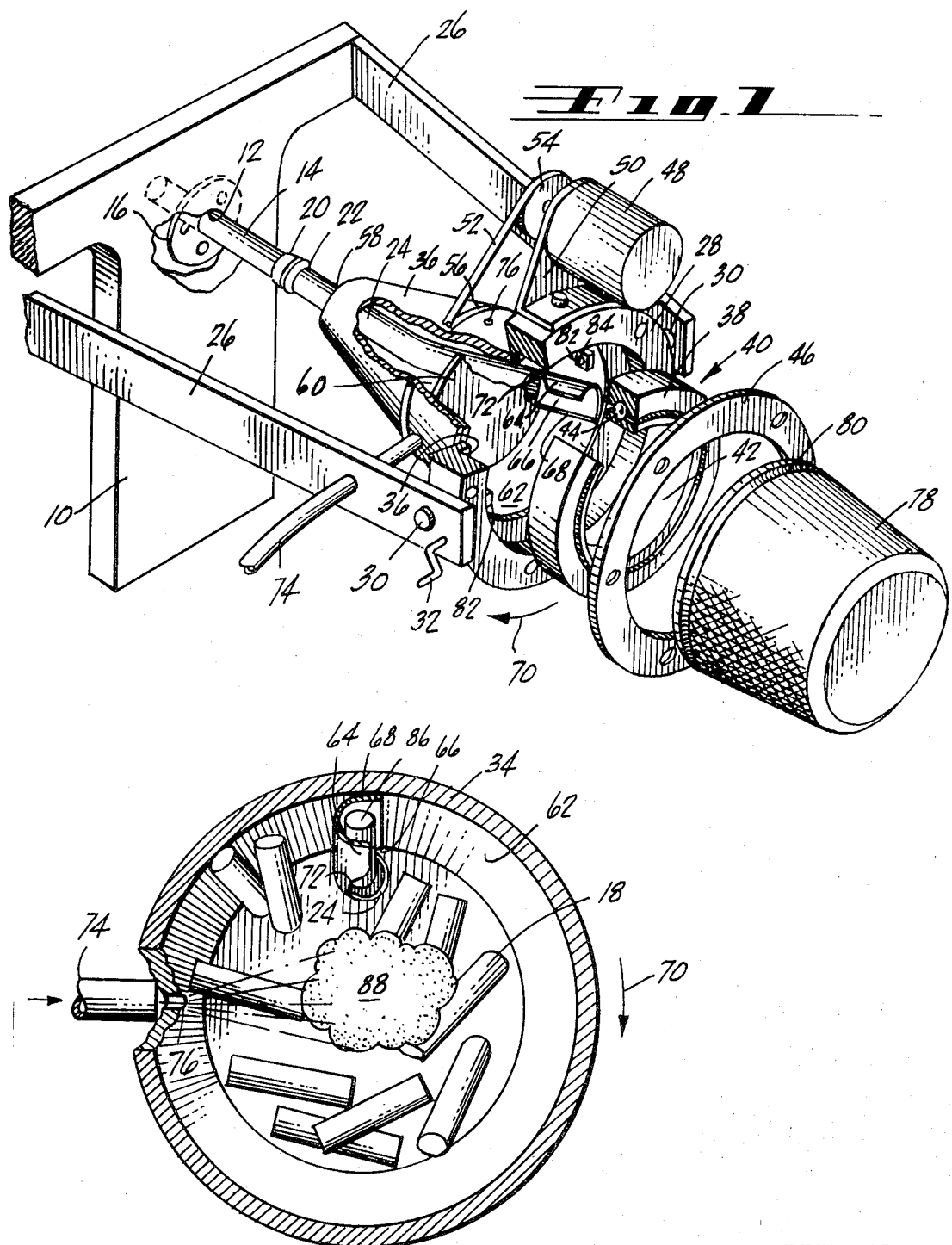
INVENTOR.
EARL K. KELLY
BY Robert O. Richardson
ATTORNEY

ROTARY RIVET DISPENSER

BACKGROUND OF THE PRESENT INVENTION

Rivet hoppers usually furnished with riveting machines typically utilize a reciprocating blade to align each rivet slug for delivery through a tube by gravity feed. The hoppers occasionally cut or otherwise damage rivet slugs but unless the hopper feed jams, the damage is not detected. On one occasion, the inspection of riveted panels revealed an average of 15 damaged rivets per panel and these rivets had to be removed and replaced. This required hand labor, requiring an average of 3 minutes per rivet. Moreover, defective rivets that were not easily detected remained in the finished panel to give the panel a latent structural weakness. These hoppers were found to jam on an average of four or five times per 8-hour shift. These required the operator to climb to the exterior surface of the panel to reach the hopper and clear the obstruction. Usually, the damage to the hopper mechanism results in 15 minutes downtime while the maintenance mechanic installs a replacement hopper. In addition, during the operation noted, the maintenance machine shop expended an average of 74 hours per month making replacement parts and repairing damaged hoppers.

A vibratory bowl feeder has been used as a replacement for delivering these rivet slugs, and while they are moderately successful, they also are bulky, complex and costly.

SUMMARY OF THE PRESENT INVENTION

The rotary rivet dispenser comprising the present invention includes a cone which rotates within a bearing housing and a detachable rivet container cup secured to the base opening of the cone. A rivet pickup tube having a scoop is fixed inside the cone cavity against an inner surface wall. The apex of the cone is normally held below the horizontal tilt axis for gravity feed of the rivets into a delivery tube. With each revolution of the cone and container cup assembly, the scoop gathers and aligns rivet slugs which travel down the tube by gravity feed, assisted by intermittent air pressure. A single hole is drilled radially through the cone. This hole passes under the end of an air pipe which directs a continuous stream in close proximity to the surface of the cone to provide an airblast through the hole with each revolution.

The advantages of the rotary rivet dispenser are compactness, mechanical simplicity, reliable operation, and elimination of damage to rivet slugs. Time loss and added production costs incurred by removal and replacement of defective rivets and the possibilty of undetected riveting faults in finished products are also eliminated. Installation of the dispenser on existing riveting machines is simple, since the new dispenser utilizes the same mount as the old hoppers. Absence of moving parts within the cone and container cup eliminates the possibility of damage to rivet slugs. Application of a simple and reliable rotary motion is characterized by smoother action of less complexity than reciprocating or oscillating devices. The design of the jamproof delivery path and pickup scoop allows excess slugs to merely spill out of the scoop when the delivery tube is filled to capacity. The ability to discard or reject excess slugs without loss, damage or malfunction is a major advantage of this dispenser. Another advantage is that this dispenser is self-cleaning when it is desirable to change sizes of rivets.

BRIEF DESCRIPTION OF THE DRAWING

FIG. 1 is an exploded view in perspective of the rotary rivet dispenser; and
FIG. 2 is a plan sectional view illustrating its operation.

Reference is now made to FIG. 1. Here there is shown a mounting plate 10 adapted to be mounted on an automatic riveting machine, not shown. This mounting plate has an opening 12 therein, through which a delivery tube 14 is extended and attached thereto by collar 16. This delivery tube carries rivet slugs, 18 in FIG. 2, with a gravity feed to a predetermined position within the automatic riveting machine, not shown. This delivery tube 14 is flared at its upper end 20 to facilitate alignment of end 22 of rivet pickup tube 24 when the pickup tube is positioned for use.

Mounting plate 10 has a pair of support arms 26 at the end of which is a bearing housing 28 pivotally mounted by bushing pins 30. A locking screw crank 32 extends through one of the support arms 26 and into an aperture in bearing housing 28 to establish the tilt axis of cone housing 34 and to align end 22 of tube 24 with end 20 of delivery tube 14. Bearing housing 28 has an inner shoulder 36 against which is positioned the outer race 38 of a ball bearing assembly 40. This assembly includes the inner race 42, bearings 44 and the outer race 38. An annular dust cover 46 fastened to the outer surface of the bearing housing 28 retains the ball bearing assembly 40 in position. The cavitated cone housing 34 is positioned within the inner race 42 which retains the housing 34 as it rotates. An electric motor 48 is positioned on a motor mount 50 fastened to the bearing housing 28. An O-ring belt 52 passes over the motor pulley 54 and around an annular groove 56 in the cone housing 34 to cause rotation thereof.

Rivet pickup tube 24 extends from its end 22, shown aligned with end 20 of delivery tube 14, through the apex 58 of the cone housing 34 and through a baffle plate 60 which forms the base of the dispenser. The tube 24 is bent out of alignment with the axis of the cone, about which axis the cone and tube rotates, so that its inner end contacts the inner wall 62 of the cone housing 34. This inner end of tube 24 is split and bent open to form a cradle 64, slot 66 and scoop 68. The leading edge of the scoop 68 faces the direction of rotation of the cone shown by arrow 70. The scoop 68 engages the inner wall surface 62 and on the downside of its rotation scoops up a plurality of rivets through the slot 66 between the scoop 68 and cradle 64. The slugs rest in alignment on the cradle 64 as the scoop 68 approaches the top or high point of its circle of revolution. Since the axis of rotation is not horizontal but tilts downward along the axis of delivery tube 14 and end 22 of pickup tube 24, all slugs in the dispensing cone will find their way through the slot 66 and down the tube 24.

Cradle 64 has an arcuate cutout portion 72 adjacent its intersection with baffle plate 60 to prevent jamming by enabling a rivet slug not properly oriented and aligned with the tube opening to simply fall out and drop back into the pile of slugs in the dispenser again.

An airblast tube 74 is affixed to one of the support arms 26 and provides an airstream against the outer surface of cone housing 34. An opening 76 in the housing is aligned to receive and pass the airblast into the housing when the scoop 68 is at the top. This momentarily pressurizes the housing and pushes a slug on cradle 64 into the pickup tube 24. The cradled slugs are shielded from the direct airblast by the cradle 64.

A detachable rivet container cup 78 completes the dispenser assembly. It has an annular groove 80 around the outer surface near the open end thereof so that it may be secured to the cavitated cone housing 34. Brackets 82 mounted on cone housing 34 have spring-loaded balls 84 therein which releasably engage groove 80 in the rivet container cup 78. The rivet container cup thus may be quickly disengaged and refilled when the rivets placed therein have become exhausted.

When refilling the container cup 78, crank 32 is first turned from its locking position and the entire assembly (housing 34, tube 24 and cup 78) is tilted to a vertical position with the cup 78 extended downward. The housing is thus self-cleaning and all remaining slugs are in the cup 78 for easy removal. Slugs of another size may then be used, as desired, by simply snapping in another cup with slugs of the desired size. The assembly is then pivoted back into position and locked by crank 32.

Reference is now made to FIG. 2. Here there is shown a plurality of rivet slugs 18 randomly oriented within the cone housing 34 and, because of the incline, resting against the inner surface wall 62. Scoop 68 with the slot 66 facing the direction of rotation shown by arrow 70 is positioned against the inner wall surface 62. Cradle 64 of scoop 68 has a slug 86 therein when in its top position of rotation. Opening 76 in housing 34 is aligned with air pipe 74 when the scoop 68 is at the top. As opening 76 becomes aligned with the air pipe 74, a blast of air 88 is injected into the container to assist in the movement of the rivet slugs through the rivet pickup tube 24 and down into the delivery tube 14, not shown.

Having thus described one form of my invention, it is to be understood that modifications thereof will readily occur to those skilled in the art and that these improvements are also to be considered as part of the present invention as defined by the claims herein.

I claim:

1. A rotary dispenser of cylindrical objects comprising:
   a housing,
   means for rotating said housing,
   a pickup tube within said housing and terminating at one end in a scope having a cradle thereon,
   said scoop being positioned against an inner wall of said housing for receiving said objects in the cradle thereof as said housing is rotated,
   said housing having a baseplate through which said pickup tube extends, said cradle having an arcuate cutout therein adjacent said baseplate whereby objects misaligned in said scoop and cradle fall out as said housing is rotated,
   said housing being rotatable about a nonhorizontal axis,
   said housing being rotatably and pivotally mounted on support arms on a mounting frame having an end of a delivery tube affixed thereto,
   said pickup tube having a lower end extending from said housing and along the rotational axis thereof,
   said pickup tube lower end being in alignment with said delivery tube upper end to pass said objects therethrough,
   said housing having an aperture therein,
   means projecting an airstream through said aperture upon each revolution of said housing,
   said scoop being at its uppermost position during its rotation when said airstream passes through said aperture to pressurize said housing and thereby propel objects on said cradle into said pickup tube.

2. A rotary dispenser as in claim 1 wherein said housing is also pivotally mounted on said mounting frame and wherein said housing may be pivoted to a vertical position with said pickup tube lower end extending upward,
   an object container cup detachably affixed to said housing to supply said housing with objects to be passed through said pickup tube, and
   wherein a lock crank releasably retains said housing in pivotal position wherein said pickup tube and said delivery tube are aligned.

3. A rotary dispenser as in claim 2 wherein said housing has spring-pressed detent means thereon, and said cup has an annular groove thereon, said detent means engaging said groove when said container cup is positioned on said housing.

* * * * *